United States Patent
Russell

(10) Patent No.: US 9,392,154 B1
(45) Date of Patent: Jul. 12, 2016

(54) ELECTRONIC DEVICE INCLUDING A CAMERA ASSEMBLY HAVING AN ELECTRICALLY CONDUCTIVE MATERIAL WITHIN A GROUND PLANE ACCESS OPENING AND RELATED METHODS

(71) Applicant: STMICROELECTRONICS (RESEARCH & DEVELOPMENT) LIMITED, Marlow Bucks (GB)

(72) Inventor: Alex Russell, Crossgates (GB)

(73) Assignee: STMICROELECTRONICS (RESEARCH & DEVELOPMENT) LIMITED, Marlow Bucks (GB)

(\*) Notice: Subject to any disclaimer, the term of this patent is extended or adjusted under 35 U.S.C. 154(b) by 0 days.

(21) Appl. No.: 14/586,177

(22) Filed: Dec. 30, 2014

(51) Int. Cl.
*H04N 5/225* (2006.01)
*G02B 13/00* (2006.01)

(52) U.S. Cl.
CPC .......... *H04N 5/2254* (2013.01); *G02B 13/0015* (2013.01)

(58) Field of Classification Search
CPC . H04N 5/2251; H04N 5/2252; H04N 5/2253; H04N 5/2254; H04N 5/2257; G03B 17/02; G03B 17/08; G03B 17/48; G03B 2217/00; G03B 2217/002; G03B 29/00; G08B 13/19619; H05K 1/00; H04M 1/0264
USPC .................................................. 348/373–376
See application file for complete search history.

(56) References Cited

U.S. PATENT DOCUMENTS

| | | | |
|---|---|---|---|
| 7,925,154 B2 | 4/2011 | Ryu | |
| 8,680,634 B2 | 3/2014 | Borthakur et al. | |
| 2008/0143871 A1 | 6/2008 | Go | |
| 2015/0340753 A1* | 11/2015 | Park | H01P 5/19 333/125 |

\* cited by examiner

*Primary Examiner* — Yogesh Aggarwal
(74) *Attorney, Agent, or Firm* — Allen, Dyer, Doppelt, Milbrath & Gilchrist, P.A.

(57) ABSTRACT

A camera assembly may include a printed circuit board (PCB), an image sensor carried by the PCB, and an electrically conductive layer carried by the PCB defining a ground plane. The camera assembly may also include a lens assembly, and a camera body that includes a dielectric layer and an electrically conductive layer thereon. The camera body may have a lens assembly opening aligned between the image sensor and the lens assembly and may also have a ground plane access opening therein aligned with the ground plane. The camera assembly may also include an electrically conductive material within the ground plane access opening coupling the electrically conductive layer to the ground plane.

20 Claims, 4 Drawing Sheets

ELECTRONIC DEVICE INCLUDING A CAMERA ASSEMBLY HAVING AN ELECTRICALLY CONDUCTIVE MATERIAL WITHIN A GROUND PLANE ACCESS OPENING AND RELATED METHODS

TECHNICAL FIELD

The present invention relates to the field of electronics and, more particularly, to camera assemblies and related methods.

BACKGROUND

It may be desirable for an electronic device, for example, a cellular telephone, to have increased functionality beyond wireless communications. For example, a mobile wireless communications device may have one or more input devices, such as a camera. As the functionality of the electronic device increases, it may be particularly desirable to shield components to reduce interference from the various components.

One potential way to address electromagnetic interference (EMI) from the various components may be to couple the components or portions thereof to a ground, for example. More particularly, a metal or metalized surface of a component may be coupled to the ground by an externally applied spot or blob of electrically conductive adhesive. However, an externally applied spot of electrically conductive adhesive may result in an unpredictable interface or connection.

SUMMARY

A camera assembly may include a printed circuit board (PCB), an image sensor carried by the PCB, and an electrically conductive layer carried by the PCB defining a ground plane. The camera assembly may also include a lens assembly, and a camera body that includes a dielectric layer and an electrically conductive layer thereon. The camera body may have a lens assembly opening aligned between the image sensor and the lens assembly and may also have a ground plane access opening therein aligned with the ground plane. The camera assembly may also include an electrically conductive material within the ground plane access opening coupling the electrically conductive layer to the ground plane. Accordingly, increased electromagnetic compliance (EMC) may be provided, for example, by an increased reliability connection between the electrically conductive layer and the ground plane.

The electrically conductive layer may be on the dielectric layer within the ground plane access opening, for example. The electrically conductive material may include an electrically conductive adhesive material.

The electrically conductive material may have a same shape as the ground plane access opening, for example. The electrically conductive layer may include metal, for example.

The ground plane may be carried by an upper surface of the PCB. The lens assembly may include a lens barrel and at least one lens carried by the lens barrel.

The camera module may include least one electrically conductive trace carried by the PCB, for example. The dielectric material may include plastic, for example.

A method aspect is directed to a method of making camera assembly that may include a printed circuit board (PCB), an image sensor carried by the PCB, an electrically conductive layer carried by the PCB defining a ground plane, a lens assembly, and a camera body that includes a dielectric layer and an electrically conductive layer thereon. The camera body may have a lens assembly opening aligned between the image sensor and the lens assembly. The method may include positioning an electrically conductive material within a ground plane access opening in the camera body aligned with the ground plane to couple the electrically conductive layer to the ground plane.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
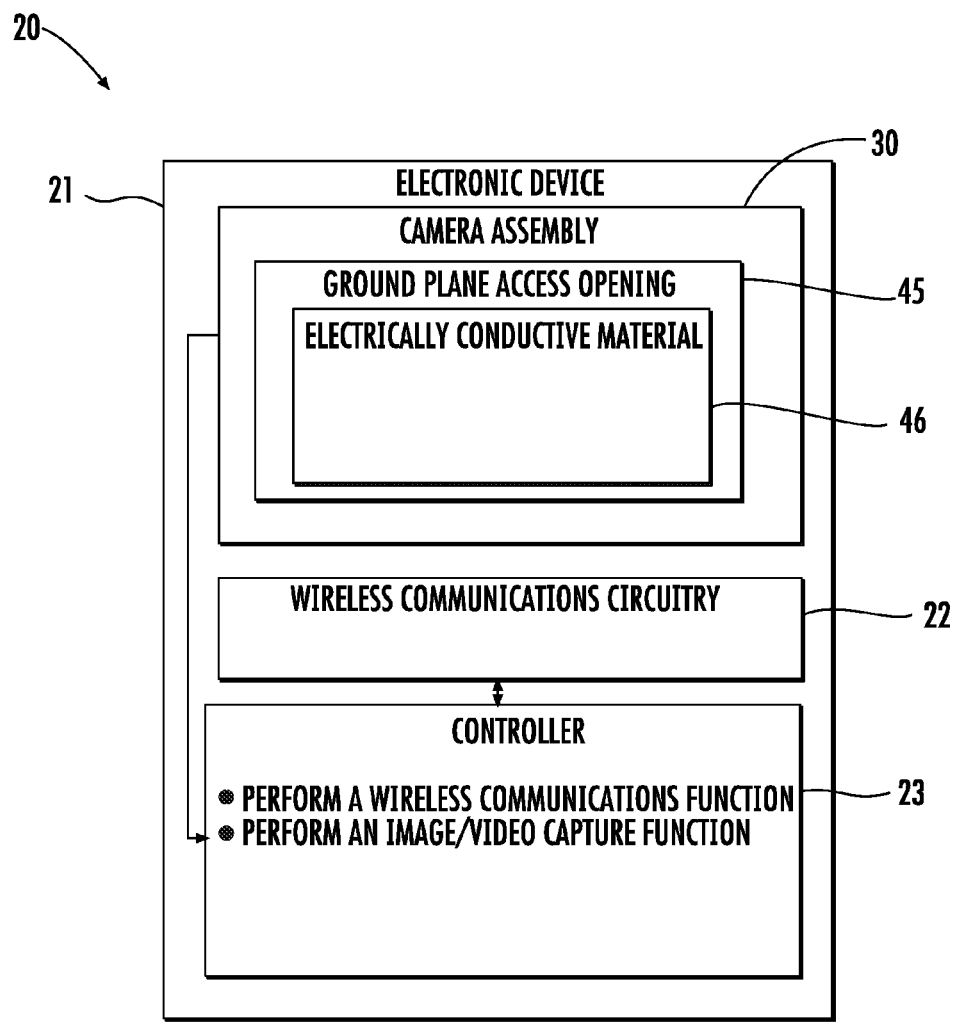
FIG. 1 is a schematic block diagram of an electronic device according to an embodiment.
Figure 2:
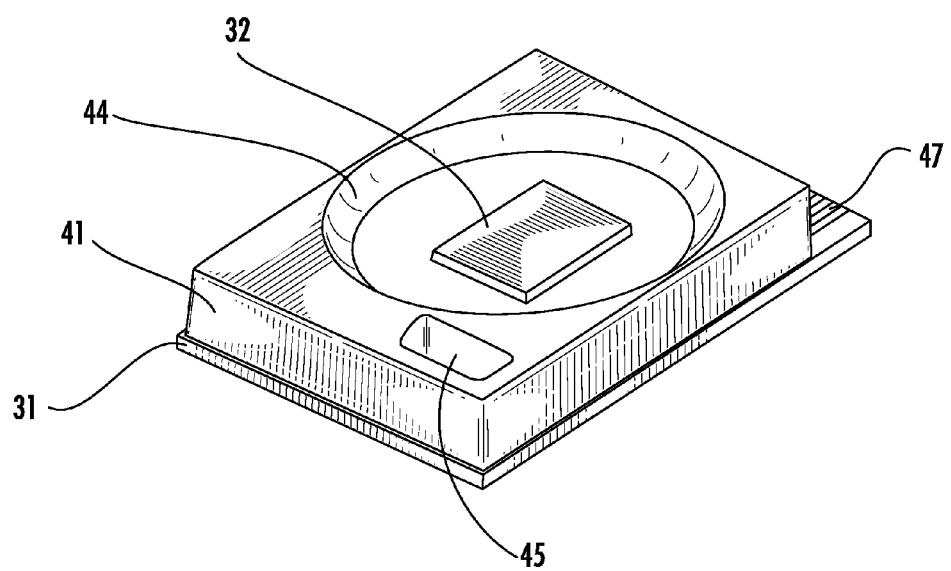
FIG. 2 is a perspective view of a portion of the camera assembly for use with the electronic device of FIG. 1.
Figure 3:
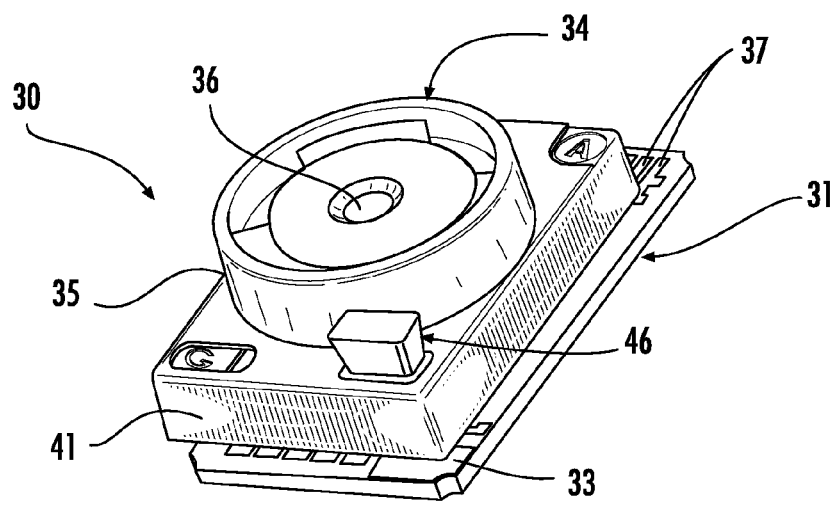
FIG. 3 is a detailed exploded perspective view of a camera assembly of the electronic device of FIG. 2.
Figure 4:
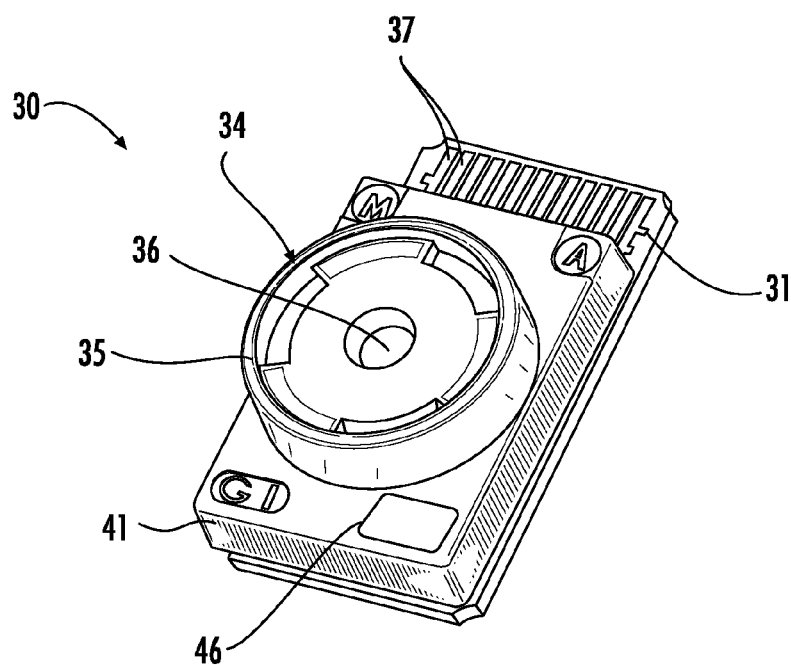
FIG. 4 is a detailed perspective view of the camera assembly of FIG. 3.
Figure 5:
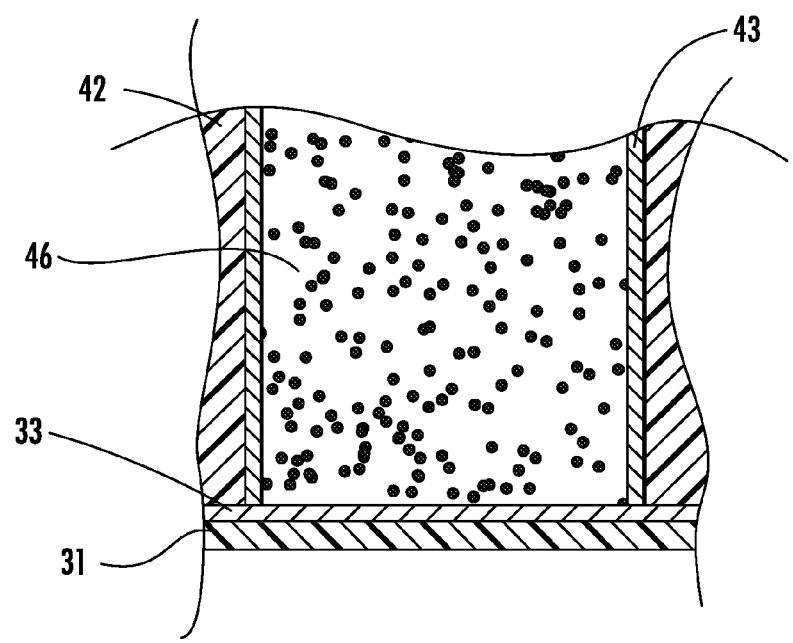
FIG. 5 is an enlarged cross-sectional view of a portion of the camera assembly of FIG. 4.

Referring initially to FIG. 1, an electronic device 20 may include a housing 21 and wireless communications circuitry 22 carried by the housing. The electronic device 20 may be a cellular telephone, tablet computer, or electronic device, for example. A controller 23 is carried by the housing 21 and cooperates with the wireless communications circuitry 22 to perform a wireless communications function. The controller 23 may perform other and/or additional functions, for example, as will be described in further detail below.

Referring now additionally to FIGS. 2-5, a camera assembly 30 is carried by the housing 21 and is coupled to the controller 23. The camera assembly 30 may cooperate with the controller 23 to perform image or video capture functions. The camera assembly 30 includes a printed circuit board (PCB) 31. An image sensor 32 is carried by the PCB 31. The image sensor 32 may be an integrated circuit (IC) image sensor, for example a semiconductor image sensor, and more particularly, a complementary metal oxide semiconductor image sensor. Of course, the image sensor 32 may be another type of image sensor, as will be appreciated by those skilled in the art.

An electrically conductive layer is carried by said PCB and defines a ground plane 33. The ground plane 33 is illustratively carried by an upper surface of the PCB 31. The ground plane extends along a portion of the upper surface of the PCB. In some embodiments, the ground plane 33 may extend along an entire surface of the PCB 31, and/or another surface of the PCB, for example a lower surface of the PCB.

The camera assembly 30 also includes a lens assembly 34. The lens assembly includes a lens barrel 35 and a lens 36. More than one lens may be included. The lens assembly 34 may include other and/or additional components, for example, an anti-reflective coating and based upon functionality, as will be appreciated by those skilled in the art.

The camera assembly 30 further includes a camera body 41. The camera body 41 includes a dielectric layer 42 and an electrically conductive layer 43 thereon. The electrically conductive layer 43 may be in the form of one or more electrically conductive traces, for example.

The dielectric layer 42 may be plastic, for example. Of course, the dielectric layer 42 may be other and/or additional dielectric materials. The electrically conductive layer 43 may be metallic, for example.

The camera body 41 has a lens assembly opening 44 aligned between the image sensor 32 and the lens assembly 34. The lens assembly 34 is positioned within the lens assembly opening 44. The camera body 41 also has a ground plane access opening 45 therein aligned with the ground plane 33. The electrically conductive layer 43 is carried by the dielectric layer 42 within the ground plane access opening 45. In particular, the electrically conductive layer 43 is carried by, via the dielectric material layer 44, a sidewall of the camera body 41 that defines the ground plane access opening 45. Of course, the electrically conductive layer 43 may be carried by the dielectric material layer 44 at additional locations along the camera body 41.

An electrically conductive material 46 is within the ground plane access opening 45. The electrically conductive material 46 couples the electrically conductive layer 43 to ground plane 33.

The electrically conductive material 46 may be an electrically conductive adhesive material, for example, glue and may fill the ground plane access opening 45 and may form to have a same shape as the ground plane access opening. The electrically conductive material 46 provides increased electromagnetic compatibility by reducing EMI.

As will be appreciated by those skilled in the art, the electrically conductive material 46 may provide increased connectivity between the metalized plastic camera body 41 or mount and the ground plane 33. Prior art electrical connections made between a metal or metalized surface of a camera body, for example, and a ground plane of a PCB used an externally applied blob or spot of a conductive adhesive, which often resulted in an unpredictable glue interface, and thus a higher rate of failure. A higher rate of failure, in turn, generally leads to a lower yield of camera assemblies, and thus profitability.

Electrically conductive traces 47 may be carried along the upper surface of the PCB 31, for example, to couple electronic components, such as the image sensor 32 to upstream or other electronic circuitry in the electronic device 20. Of course, electrically conductive traces may be carried by a lower surface of the PCB 31 or both the upper and lower surfaces of the PCB. Other and/or additional electronic components may be carried by the PCB 31 as will be appreciated by those skilled in the art.

A method aspect is directed to a method of making the camera assembly 30. The camera assembly 30 includes a PCB 31, an image sensor 32 carried by the PCB, an electrically conductive layer carried by the PCB defining a ground plane 33, a lens assembly 34, and a camera body 41 that includes a dielectric layer 42 and an electrically conductive layer 43 thereon. The camera body 41 has a lens assembly opening 44 aligned between the image sensor 32 and the lens assembly 34. The method includes positioning an electrically conductive material 46 within a ground plane access opening 45 in the camera body 41 aligned with the ground plane 33 to couple the electrically conductive layer to the ground plane.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A camera assembly comprising:
   a printed circuit board (PCB)
   an image sensor carried by said PCB;
   a ground plane carried by said PCB;
   a lens assembly;
   a camera body comprising a dielectric layer and an electrically conductive layer thereon, said camera body having a lens assembly opening aligned between said image sensor and said lens assembly and having a ground plane access opening therein aligned with the ground plane; and
   an electrically conductive material within the ground plane access opening coupling said electrically conductive layer to said ground plane.

2. The camera module of claim 1, wherein said electrically conductive layer is on said dielectric layer within the ground plane access opening.

3. The camera module of claim 1, wherein said electrically conductive material comprises an electrically conductive adhesive material.

4. The camera module of claim 1, wherein said electrically conductive material has a same shape as the ground plane access opening.

5. The camera module of claim 1, wherein said electrically conductive layer comprises metal.

6. The camera module of claim 1, wherein the ground plane is carried by an upper surface of said PCB.

7. The camera module of claim 1, wherein said lens assembly comprises a lens barrel and at least one lens carried by said lens barrel.

8. The camera module of claim 1, further comprising at least one electrically conductive trace carried by said PCB.

9. The camera module of claim 1, wherein said dielectric material comprises plastic.

10. An electronic device comprising:
    a housing;
    wireless communications circuitry carried by said housing;
    a camera assembly carried by said housing and comprising
      a printed circuit board (PCB),
      an image sensor carried by said PCB,
      a ground plane carried by said PCB,
      a lens assembly,
      a camera body comprising a dielectric layer and an electrically conductive layer thereon, said camera body having a lens assembly opening aligned between said image sensor and said lens assembly and having a ground plane access opening therein aligned with the ground plane, and
      an electrically conductive material within the ground plane access opening coupling said electrically conductive layer to said ground plane; and
    a controller coupled to said wireless communications circuitry and said camera module.

11. The electronic device of claim 10, wherein the electrically conductive layer is on said dielectric layer within the ground plane access opening.

12. The electronic device of claim 10, wherein said electrically conductive material comprises an electrically conductive adhesive material.

13. The electronic device of claim 10, wherein said electrically conductive material has a same shape as the ground plane access opening.

14. The electronic device of claim 10, wherein said electrically conductive layer comprises metal.

15. The electronic device of claim 10, wherein the ground plane is carried by an upper surface of said PCB.

16. The electronic device of claim 10, wherein said lens assembly comprises a lens barrel and at least one lens carried by said lens barrel.

17. A method of making camera assembly comprising a printed circuit board (PCB), an image sensor carried by the PCB, a ground plane carried by the PCB, a lens assembly, and a camera body comprising a dielectric layer and an electrically conductive layer thereon, the camera body having a lens assembly opening aligned between the image sensor and the lens assembly, the method comprising:

positioning an electrically conductive material within a ground plane access opening in the camera body aligned with the ground plane to couple the electrically conductive layer to the ground plane.

18. The method of claim 17, wherein the electrically conductive layer is on the dielectric layer within the ground plane access opening.

19. The method of claim 17, wherein positioning the electrically conductive material comprises positioning an electrically conductive adhesive material.

20. The method of claim 17, wherein the electrically conductive material has a same shape as the ground plane access opening.

* * * * *